United States Patent [19]

Barraclough

[11] Patent Number: 6,163,335
[45] Date of Patent: Dec. 19, 2000

[54] MULTIPLE-MODE VIDEOCONFERENCING ARRANGEMENT

[75] Inventor: Keith Barraclough, Menlo Park, Calif.

[73] Assignee: Netergy Networks, Santa Clara, Calif.

[21] Appl. No.: 09/031,085

[22] Filed: Feb. 26, 1998

[51] Int. Cl.[7] .................................................. H04N 7/14
[52] U.S. Cl. ........................... 348/15; 348/14; 379/93.21
[58] Field of Search ................... 348/14, 15; 379/100.01, 379/100.02, 100.14, 354, 355, 356, 93.21; H04N 7/15

[56] References Cited

FOREIGN PATENT DOCUMENTS

| 4030889691A | 4/1991 | Japan | H04N 7/14 |
| 407038863A | 2/1995 | Japan | H04N 7/14 |
| 408140075A | 5/1996 | Japan | H04N 7/14 |

*Primary Examiner*—Curtis A. Kuntz
*Assistant Examiner*—Melur Ramakrishnaiah

[57] ABSTRACT

A videoconferencing system includes a videoconferencing arrangement with the capability to automatically determine whether a videoconferencing or conventional telephone call is being initiated. In one embodiment, a portable telephone unit includes a preprogrammed memory storing codes that indicate whether a telephone number input to the telephone unit should be used to initiate a videoconferencing or conventional telephone call. If a conventional telephone call is being initiated, the video processing functions of the videoconferencing unit are not activated and the user proceeds with the conventional telephone call. If a videoconferencing call is being initiated, the videoconferencing unit establishes a data connection with a compatible device at the remote end of the communications channel and proceeds with the videoconference. In another embodiment, a portable telephone unit interfaces with a remotely located switch circuit and the switch circuit determines whether the telephone call input to the portable telephone unit should be used to initiate a videoconferencing call or a conventional telephone call. The switch circuit includes a preprogrammed memory storing codes that indicate whether the telephone number input to the telephone unit should be used to initiate a videoconferencing or conventional telephone call.

21 Claims, 9 Drawing Sheets

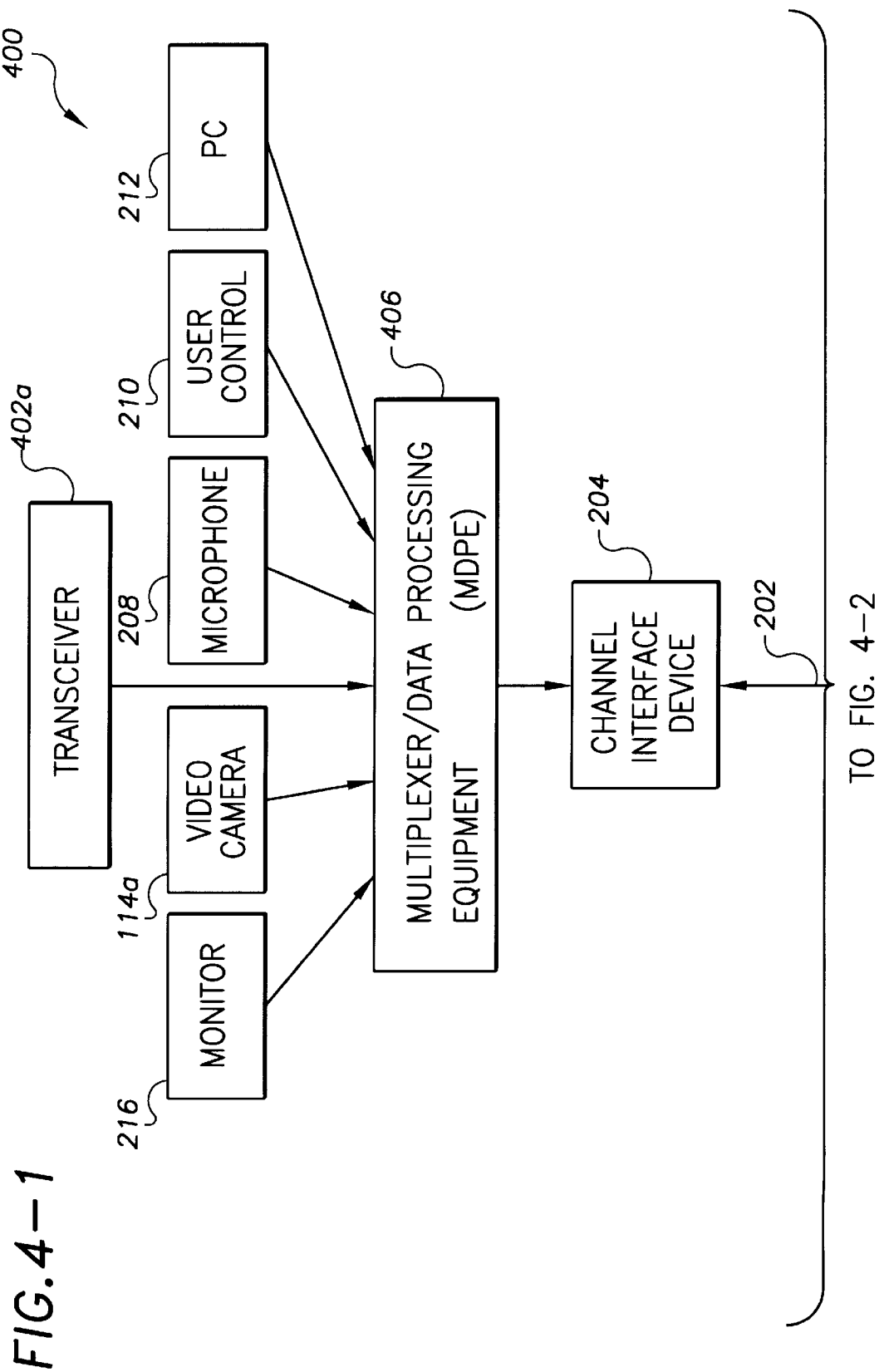

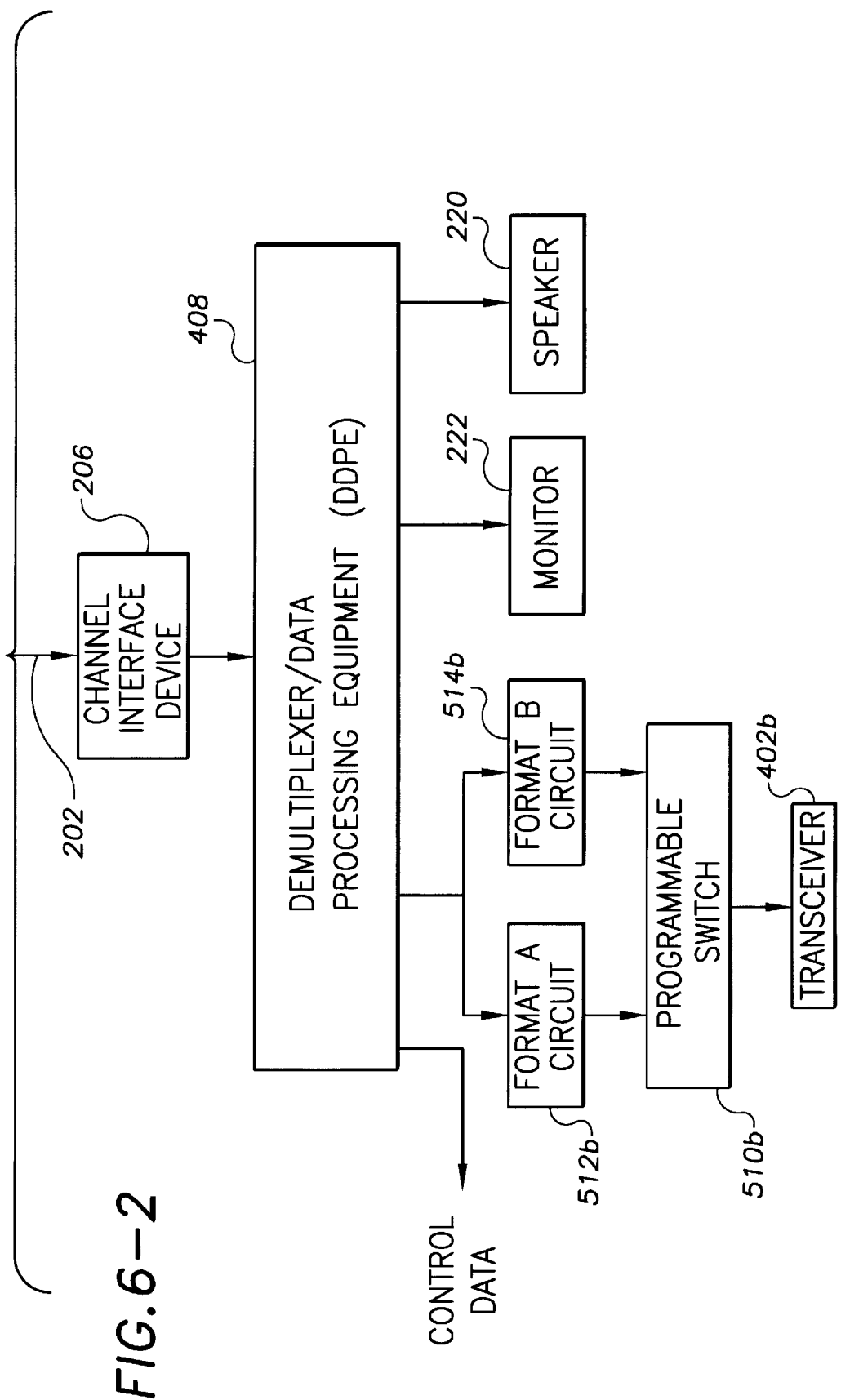

MULTIPLE-MODE VIDEOCONFERENCING ARRANGEMENT

FIELD OF THE INVENTION

The present invention relates generally to communications systems and, more particularly, to video communications systems and arrangements that operate with telephony devices.

BACKGROUND OF THE INVENTION

Video communications systems have become increasingly popular. Videoconferencing, for example, is becoming more common in both business and residential applications. Videoconferencing permits audio as well as visual live communication between two remotely located terminals communicating over a single channel. Videoconferencing has had limited success due to, for example, unavailability of a common network interface, overly complex controls, poor video quality, limited functionality, inconvenience, and high cost. Improving video quality and functionality while simultaneously decreasing costs has proven to be difficult. For this reason, there have been opposing pressures to develop certain more expensive systems having increased video quality and functionality and certain other systems that forego the convenience and quality criteria for the sake of reducing costs.

One recent approach, that attempts to address some of the above-mentioned issues, uses a digital video camera coupled to the input port of a PC ("personal computer"). The PC is programmed to provide videoconferencing over a communications channel, such as a plain old telephone ("POTS") line. This approach is useful for applications where a PC is readily available and the user is fully familiar with downloading the software and using the PC to control the videoconferencing. However, the approach is disadvantageous for environments directed to those who are not as computer literate or not as interested in using a computer for videoconferencing. The above types of implementation are, of course, a compromise. Ideally, videoconferencing systems and equipment can be provided for both business and residential applications at reasonable cost and without sacrificing video quality, functionality, or convenience.

Another approach has been to employ a set-top videoconference unit on a conventional television monitor with a communicatively-coupled camera co-located or integral with the unit. The unit is arranged to provide an interface between the communications channel (for example, the POTS line) and a conventional telephone. The telephone is used to control the unit and provide a two-way audio interface for the videoconference. Full videoconference functionality, of course, requires a compatible unit at the other end of the communications channel. A videoconference call is typically coordinated in advance, with a call being initiated by a unit at one end of the communications channel while the unit at the other end is powered and ready to link-up with the data sent from the initiating unit. If the user of the unit at the other end does regularly have the unit powered and ready to link-up, or the unit is otherwise not available, the videoconference communication fails.

SUMMARY

The present invention is directed to methods and arrangements for use in videoconferencing. According to one embodiment, the present invention is directed to a videoconferencing system including a videoconferencing arrangement with the capability to automatically determine whether a videoconferencing or conventional telephone call is being initiated.

In one specific example embodiment, a portable telephone unit includes a preprogrammed memory storing codes that indicate whether a telephone number input to the telephone unit should be used to initiate a videoconferencing or conventional telephone call. If a conventional telephone call is being initiated, the video processing functions of the videoconferencing unit are not activated and the user proceeds with the conventional telephone call. If a videoconferencing call is being initiated, the videoconferencing unit establishes a data connection with a compatible device at the remote end of the communications channel and proceeds with the videoconference.

In another specific example embodiment, a portable telephone unit interfaces with a remotely located switch circuit and the switch circuit determines whether the telephone call input to the portable telephone unit should be used to initiate a videoconferencing call or a conventional telephone call. The switch circuit includes a preprogrammed memory storing codes that indicate whether the telephone number input to the telephone unit should be used to initiate a videoconferencing or conventional telephone call.

The above summary of the invention is not intended to describe each disclosed embodiment of the present invention. An overview of other aspects and example implementations will be recognized from the figures and the detailed description that follows.

BRIEF DESCRIPTION OF THE DRAWINGS

Other aspects and advantage of the present invention will become apparent upon reading the following detailed description and upon reference to the drawings in which.

Figure 1:
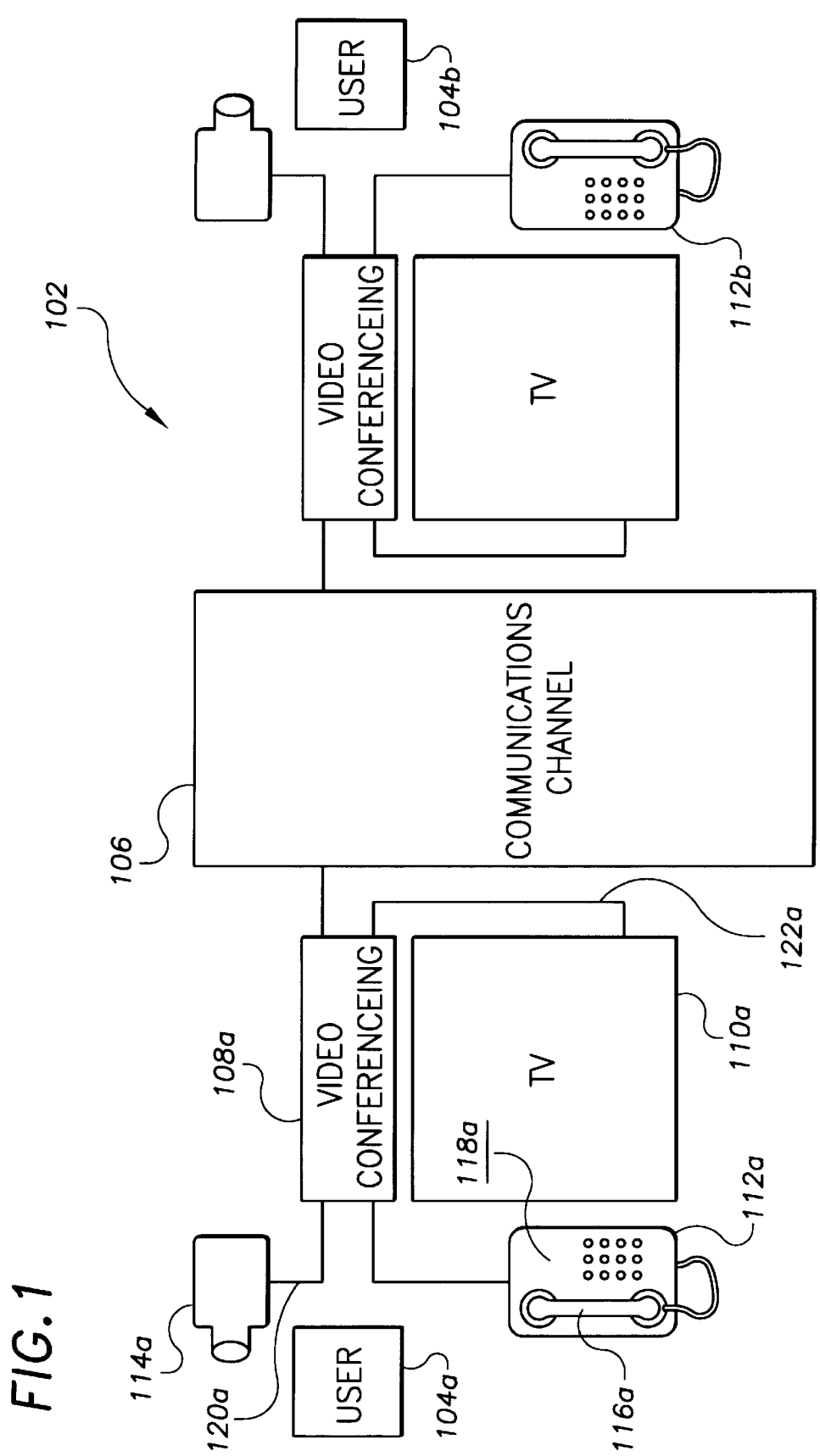
FIG. 1 is a block diagram of a videoconferencing system, according to a particular application of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as described by the appended claims.

DETAILED DESCRIPTION OF THE PREFERRED EMBODIMENT

The present invention is believed to be applicable to a variety of systems and arrangements that communicate video and other types of signals, such as audio. The invention has been found to be particularly advantageous in application environments in which a videoconferencing system uses a telephone for videoconference control functions and for an audio interface. An appreciation of various aspects of the invention is best gained through a discussion of various application examples operating in such environments. One such environment is described in connection with products available from 8×8, Inc. of Santa Clara, Calif. and through U.S. patent application Ser. No. 09/005,053, entitled "VIDEOCOMMUNICATING AND METHOD THEREFOR", filed on Jan. 9, 1998, and incorporated herein by reference. In the example embodiments discussed below, it will be understood that these described products and arrangements can be modified to be consistent with the below-described structures and functionality.

FIG. 1 is a functional block diagram of an example communication system according to an embodiment of the present invention. The system 102 exemplifies an environment in which users 104a and 104b communicate via video and audio signals. In the example embodiment, communication channel 106 is the medium through which communication signals are carried. Those skilled in the art will recognize that communication channel 106 can be used in various applications as an interface, for example, with a public switched telephone network, a private telephone exchange, an internet, a private network or a less complex direct interface.

Each of users 104a and 104b have a respective videoconferencing arrangement available for local use. For example, user 104a interacts with videoconferencing unit 108a, which is coupled to communications channel 106. Peripheral components that are coupled to videoconferencing unit 108a include conventional television 110a, conventional telephone 112a, and conventional video camera 114a.

Telephone 112a is used for both control of videoconferencing unit 108a and for transmission of audio communication between users 104a and 104b. To initiate communication between user 104a and user 104b, user 104a displaces handset 116a from base unit 118a and keys in the telephone number of telephone 112b. According to the present invention, at least one of the videoconferencing arrangements has the capability to automatically determine whether a videoconferencing or conventional telephone call is being initiated. If a conventional telephone call is being initiated, the video processing functions of the videoconferencing unit are not activated and the user proceeds with the conventional telephone call. If a videoconferencing call is being initiated, the videoconferencing unit establishes a data connection with a compatible device at the remote end of the communications channel and proceeds with the videoconference. Preprogrammed codes are stored and then accessed in response to a user request, such as entering a telephone number, to initiate a communication.

It will be appreciated that cost savings are realized through various aspects of the embodiment of FIG. 1. For instance, videoconferencing unit 108a does not need to include telephone circuitry. That is, a conventional telephone may be coupled to videoconferencing unit 108a. Further, cost savings are realized because videoconferencing unit 108a interfaces with conventional television 110a and conventional video camera 114a. Therefore, user 104a, who may already possess a television 110a and video camera 114a, need only acquire videoconferencing unit 108afor purposes of videoconferencing with another user. Videoconferencing unit 108areceives as input video signals from video camera 114a via signal line 120a. In addition, videoconferencing unit 108a outputs video signals to television 110a via signal line 122a.

Videoconferencing unit 108a can be implemented using a variety of processing arrangements, including those disclosed through the previously-mentioned U.S. patent application.

Figures 1, 2:
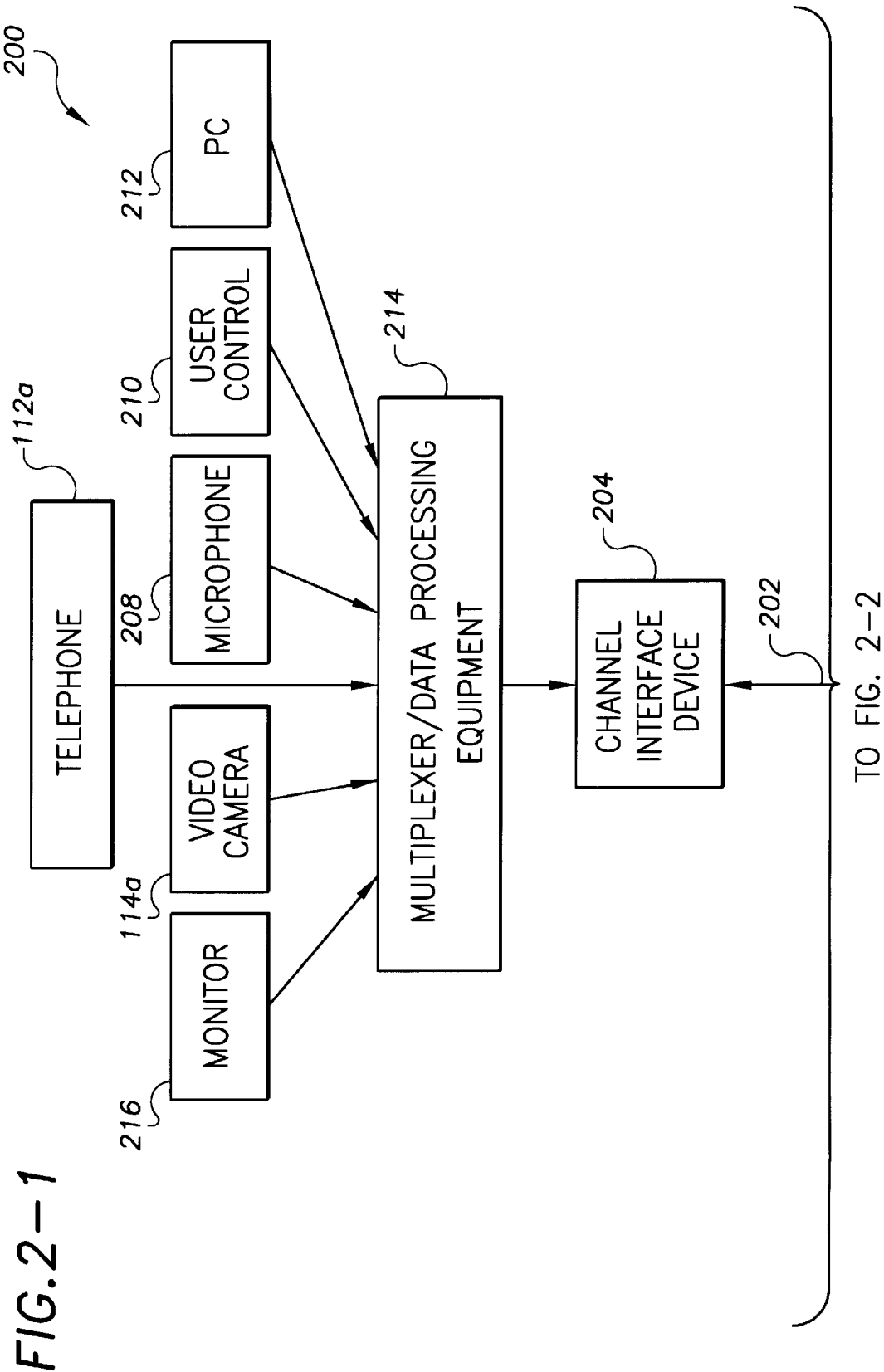
FIG. 2 is another block diagram of a videoconferencing system, illustrating data flow from a first videoconferencing terminal to a second videoconferencing terminal, consistent with the system of FIG. 1 and also according to the present invention.
Figure 2:
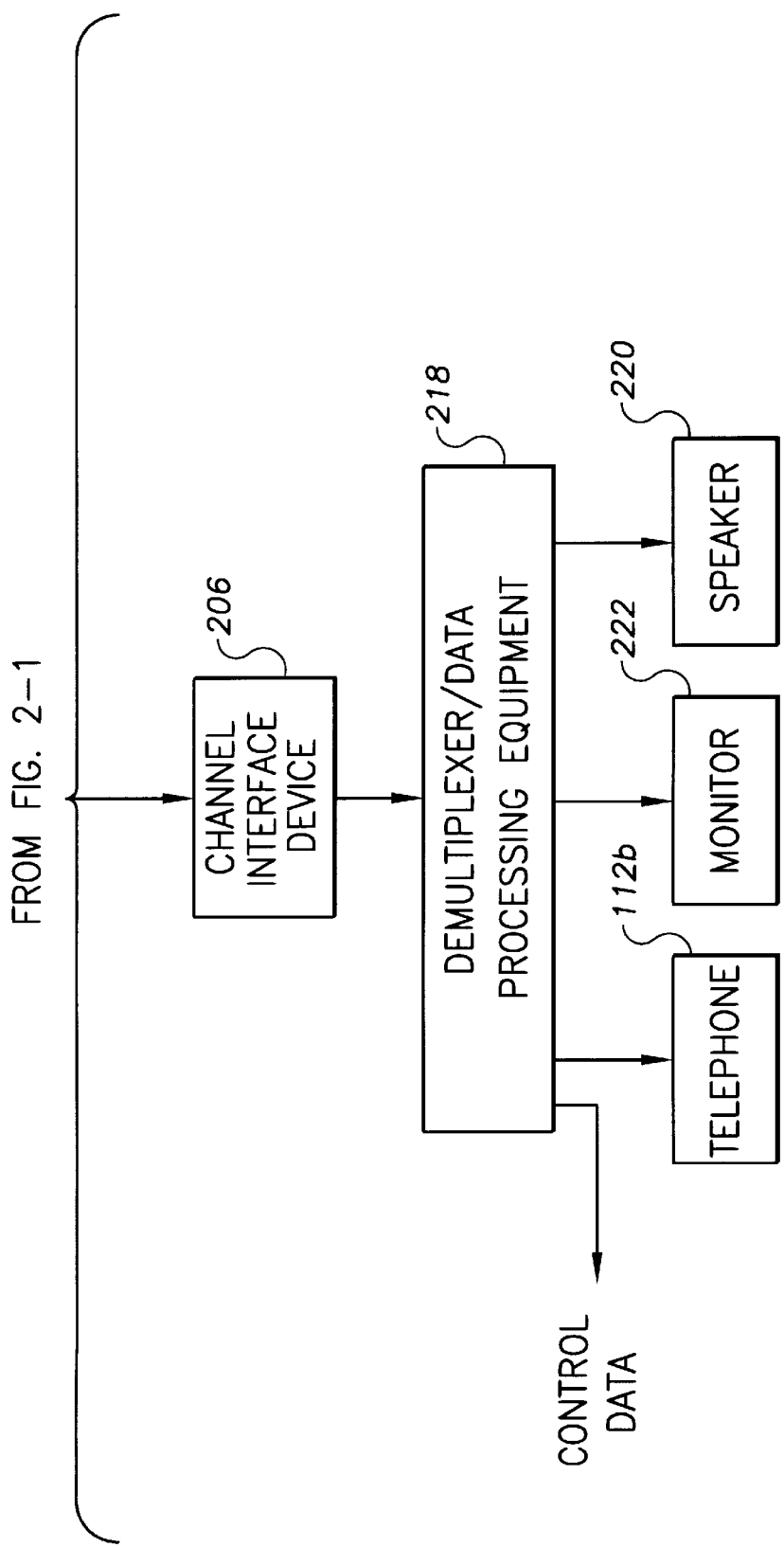

FIG. 2 is a functional block diagram of an example videoconferencing system. The system includes data sending equipment depicted above communication channel 202 and data receiving equipment depicted below communication channel 202. While the sending and receiving of such data is often reciprocal in many data processing applications of this type as with the videoconferencing illustration, the configuration illustrated in FIG. 2 is simplified in this regard to facilitate the discussion.

At the sending of the system 200, a transmitting channel interface device 204 is used to send processed data over communication channel 202 to the receiving channel interface device 206. The data that is presented to the channel interface device 204 is collected from various types of data sources including, for example, video camera 114, microphone 208, user control device 210, and conventional personal computer 212. The data sources typically use buffers to store the data to be collected. The data collected from each of these data sources is received by multiplexer/data processing equipment (MDPE) 214. MDPE 214 monitors the available channel bandwidth and, based on its capacity to transmit additional data, collects and formats the data collected from each of the input sources so as to maximize the amount of data to be transmitted over channel 202. Monitor 216 is optionally used with video camera 114 to monitor the manner in which the video images are captured by the video camera 114.

At the lower end of system 200, the formatted data communicated over channel 202 is received by channel interfaced device 206, which then presents the received data to demultiplexer/data processing equipment (DDPE) 218. DDPE 218 is set up to sort out the formatted data received over channel 202 according to instructions previously sent by the MDPE 214. The demultiplexed data is then presented to the appropriate output source equipment, including audio data to speaker 220, video data to monitor 222, control data to external equipment for subsequent processing, and audio signals to telephone 112. The control data can be also be used for controlling other units and/or applications, such as those described in copending patent applications entitled, "DATA PROCESSOR HAVING CONTROLLED SCALABLE INPUT DATA SOURCE AND METHOD THEREOF" and "VIDEO TTY DEVICE AND METHOD FOR VIDEOCONFERENCING," filed on Mar. 13,1997 and Sep. 19,1997, and having serial numbers, 08/815,966 and 08/934,184, respectively. Both patent applications are herein incorporated by reference.

MDPE and DDPE may be implemented, for example, with a processor-based data processing arrangement similar to that of a videoconferencing unit as described in the above referenced patents.

Figure 3:
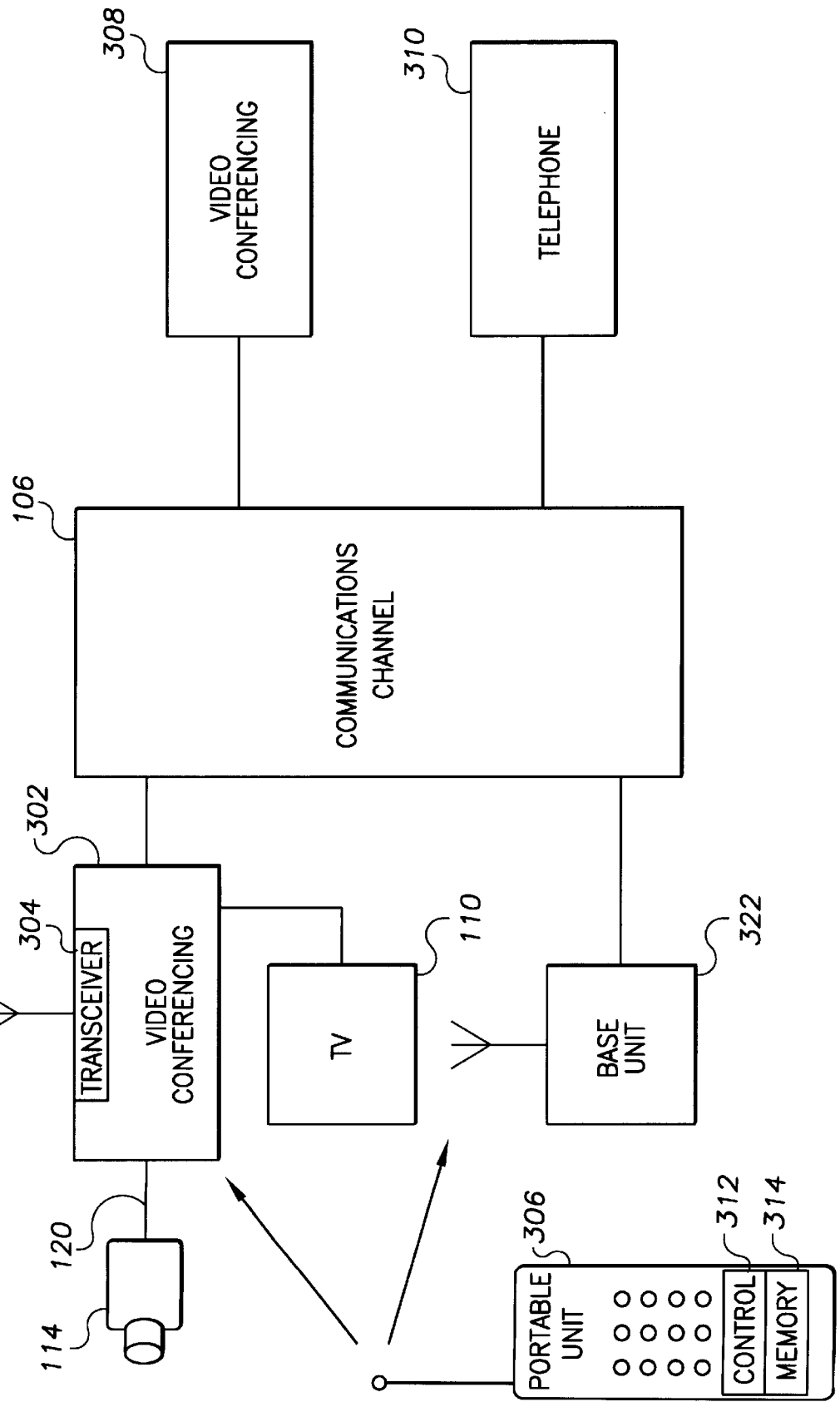
FIG. 3 a block diagram of another videoconferencing system, also according to the present invention.

FIG. 3 is a system block diagram of another example embodiment according to the present invention. The embodiment of FIG. 3 includes a cordless telephone transceiver 304 for communicating with portable telephone unit 306. As with the embodiment of FIG. 1, the embodiment shown in FIG. 3 has the capability of communicating, via portable telephone unit 306, with either videoconferencing arrangement 308 or conventional telephone 310. This example embodiment achieves this capability by configuring the portable telephone unit 306 to include a control circuit 312 and a programmable memory 314.

To program portable telephone unit 306, in accordance with one application, a user enters codes which are stored in memory 314. The codes may be telephone numbers or short-hand sequences associated with the telephone numbers. The codes can indicate the telephone number as well as capabilities associated with the telephone numbers. Such capabilities indicate, for example, whether or not a telephone number is associated with videoconferencing capabilities. After portable telephone unit 306 is programmed, when a user keys in a telephone number, portable telephone unit 306 accesses memory 314 to obtain the capability associated with the entered telephone number. If the videoconferencing capability is associated with the telephone number, portable telephone unit 306 indicates in an initial transmission signal whether videoconferencing unit 302 should establish a telephone connection, or whether base unit 322 should establish a telephone connection. Circuitry within each of videoconferencing unit 302 and base unit 322 is responsive to the initial transmission signal. The initial transmission signal may be a modulated analog signal or a digital signal from the portable unit 306.

Transceiver 304 of videoconferencing unit 302 receives audio signals from portable unit 306 and mixes them with video data from video camera 114 as input on signal line 120. Videoconferencing unit 302 transmits the mixed audio and the video data via communications channel 106 to a videoconferencing arrangement 308. Optionally, videoconferencing unit 302 may also output a mixed video and audio signals to television 110.

If the telephone number entered by the user has in memory 314 an associated capability of a conventional telephone, control circuit 312 directs portable telephone unit 306 to indicate in an initial transmission signal that base unit 322 should establish a telephone connection. Base cordless telephone unit 322 receives audio signals and interfaces with communications channel 106 to transmit such signals to conventional telephone 310, for example. Those skilled in the art will recognize that communications channel 106 could be comprised of separate communication channels for interfacing with videoconferencing arrangement 308 and conventional telephone 310.

Figures 2, 4:
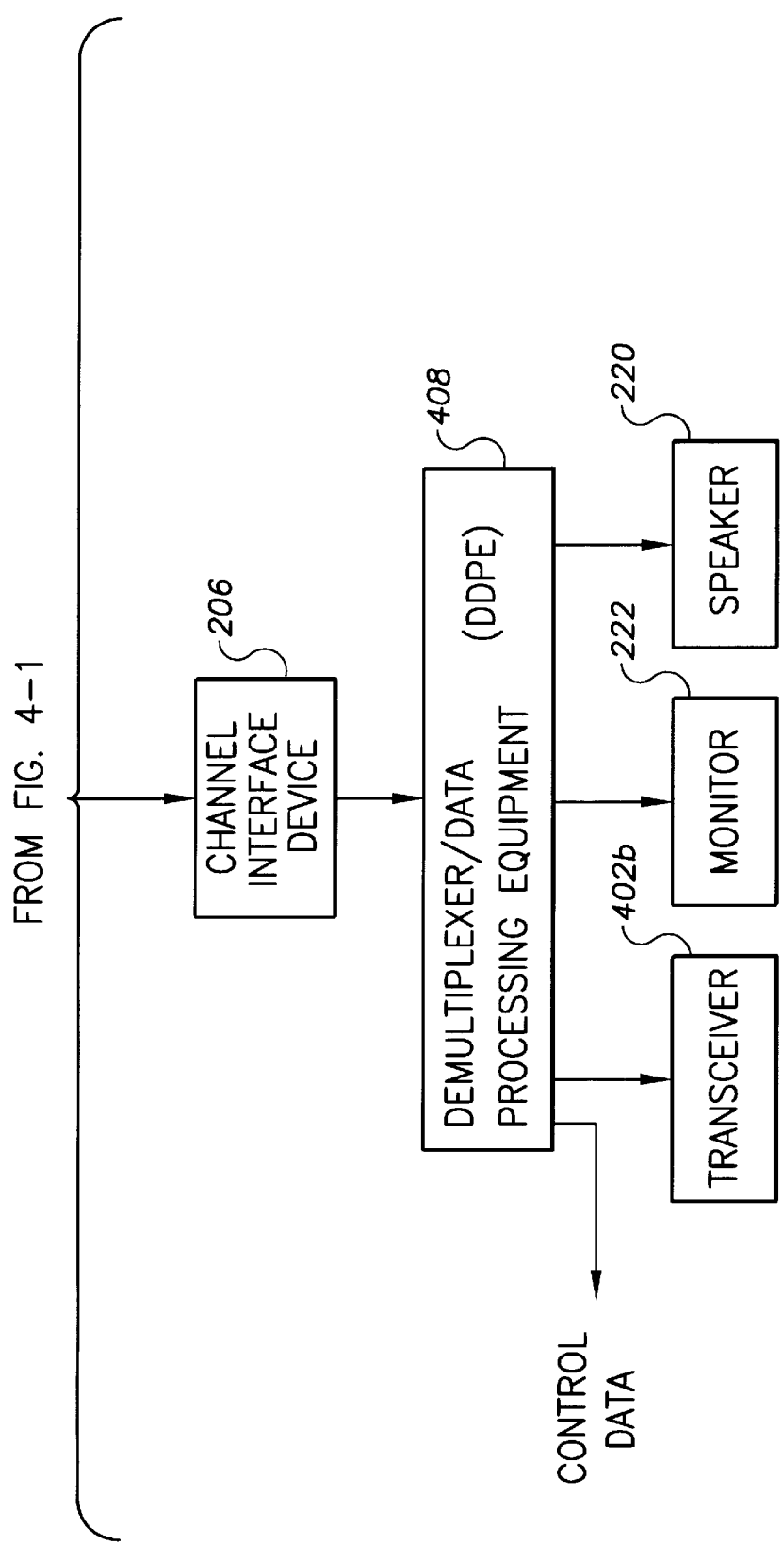
FIG. 4 is another block diagram of a videoconferencing system, illustrating data flow from a first videoconferencing terminal to a second videoconferencing terminal, consistent with the system of FIG. 3 and also according to the present invention.

FIG. 4 if a functional block diagram of an example embodiment of a videoconferencing system 400. Most of the details pertaining to videoconferencing system 400 are similar to those described along with FIG. 2. Therefore, the discussion of those elements will not repeated for FIG. 4. Videoconferencing system 400 differs from videoconferencing system 200 of FIG. 2 in that videoconferencing system 400 includes a cordless telephone transceivers 402a and 402b. Conventional cordless telephone transceiver circuitry may be used to implement transceivers 402a–b. Because videoconferencing system 400 includes cordless telephone transceivers 402a–b, MDPE 406 and DDPE 408 must be adapted to interface with transceivers 402a–b.

MDPE 406 may also include, for example, a priority handler for processing of competing control requests. The priority handler can be implemented in software for the processor arrangement of the MDPE. In an example embodiment, the priority handler gives priority of local control requests (such as those from a computer keyboard) over remote requests (such as those from portable unit 306.

Figure 5:
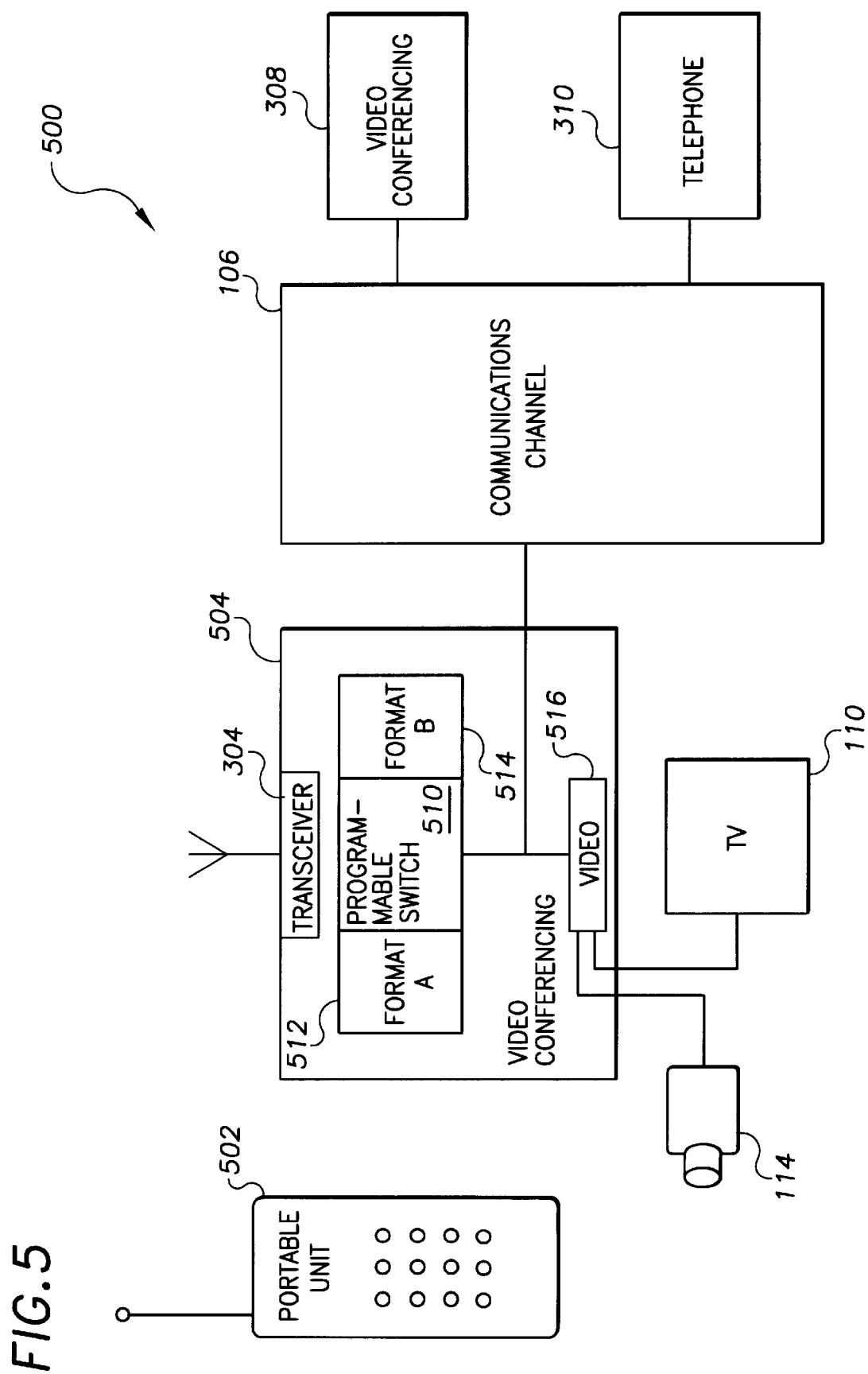
FIG. 5 a block diagram of another videoconferencing system, also according to the present invention.

FIG. 5 is a functional block diagram of yet another embodiment according to the present invention, wherein a videoconferencing unit includes a cordless telephone transceiver along with a programmable switch for selecting from more than one format of audio data signals. System 500 includes cordless portable telephone unit 502, videoconferencing unit 504, communications channel 106, and one or more videoconferencing units and telephone units such as videoconferencing unit 308 and telephone 310.

Videoconferencing unit 504 includes conventional cordless telephone transceiver circuitry 304 for communicating with portable telephone unit 502. Transceiver 304 is coupled to programmable switch 510 and also to circuit 512 for formatting audio signals according to format A and to circuit 514 for formatting audio signals according to format B. Programmable switch 510 selects either of the signals generated by circuit 512 or circuit 514 depending upon its programming, wherein the programming indicates which format to select for a particular telephone number. For example, when a user enters the telephone number for videoconferencing arrangement 308 at portable telephone unit 502, the programmable switch 510 may be preprogrammed to use the audio signals of format A from circuit 514 for communication with videoconferencing arrangement 308. Similarly, if a user initiates communication with a conventional telephone, such as telephone 310 (not having videoconferencing capabilities), programmable switch 510 may be preprogrammed to select audio signals of format B from circuit 514 for communication with telephone 310. Preprogramming videoconferencing unit 504 eliminates the need for videoconferencing unit 504 to perform handshaking functions with a called device, such as videoconferencing arrangement 308 or telephone 310, in order to determine the capabilities of the device and the proper format for audio signals.

Videoconferencing unit 504 also includes video interface circuit 516 for receiving video signals from video camera 114 and for outputting video signals to television 110.

Figures 1, 6:
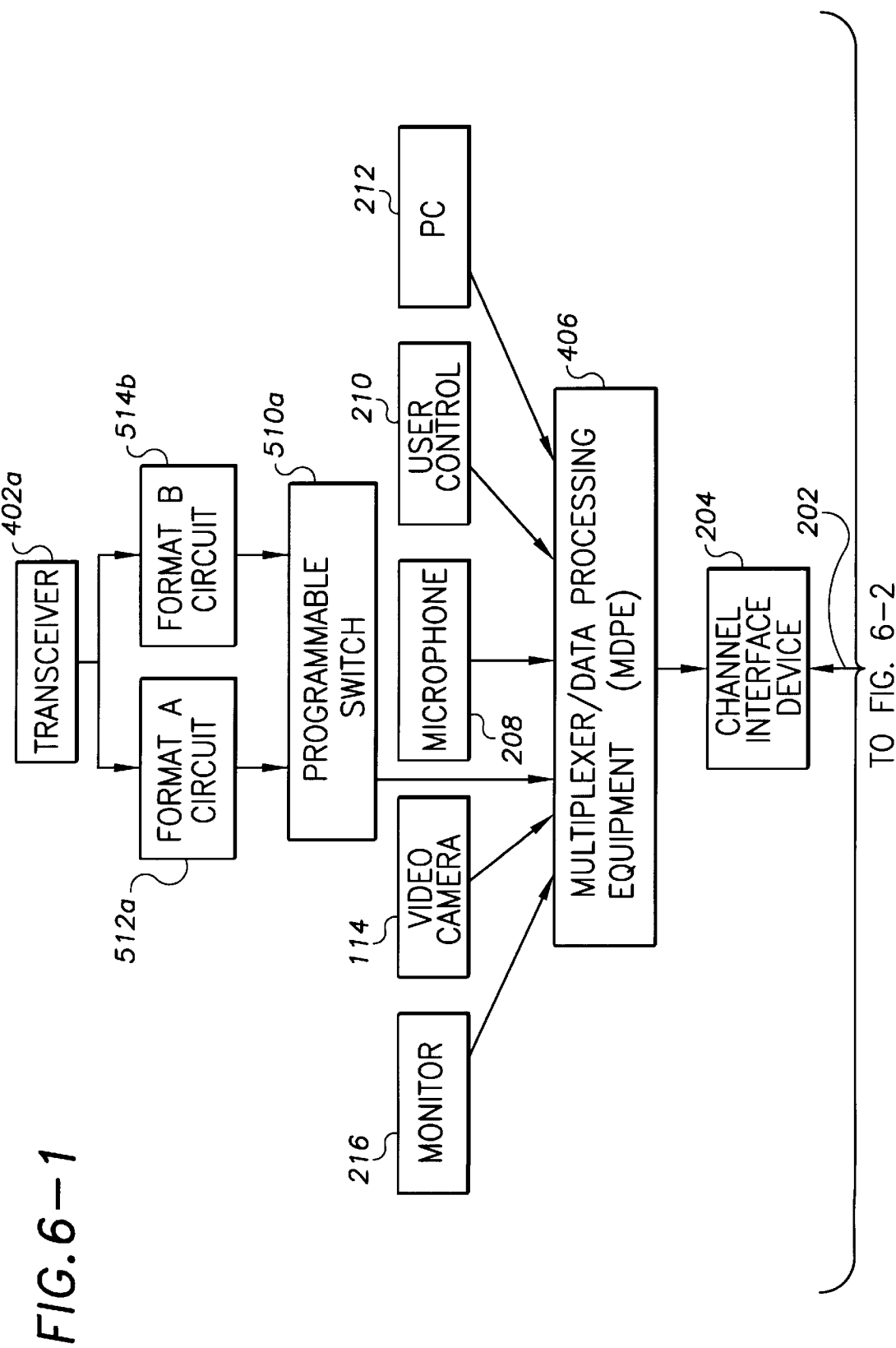
FIG. 6 is another block diagram of a videoconferencing system, illustrating data flow from a first videoconferencing terminal to a second videoconferencing terminal, consistent with the system of FIG. 5 and also according to the present invention.

FIG. 6 is a functional block diagram of an example circuit arrangement according to the embodiment of the invention as described in FIG. 5. The organization of FIG. 6 is similar to the organization of FIG. 4. However, FIG. 6 includes programmable switch circuitry and format circuitry for selectively outputting audio signals of a desired format. The aspects of FIG. 6 which are similar to the aspects of FIGS. 2 and 4 will not be repeated in the interest of brevity.

On the transmission side of system 600, transceiver 402a is coupled to circuit 512a and circuit 512b for formatting audio signals received by transceiver 402a. Circuits 512a and 512b are coupled to programmable switch 510a, which in turn is coupled to MDPE 406. Programmable switch 510a includes circuitry for selecting between signals from circuit 512a or circuit 512b, along with circuitry for allowing a user to program it such that specified phone numbers are associated with a desired format, for example, format A or format B.

In the receiving section of system 600, circuit 512b and circuit 514b are coupled to DPPE 408. Circuits 512b and 514b are in turn coupled to programmable switch 510b, whose output is coupled to transceiver 402b. Circuitry on the receiver side of system 600 formats and selects audio signals received over channel 202 for transmission by transceiver 402a to a portable telephone unit (not shown). Audio signals are directed to both circuit 512b and 514b by DDPE 408, and circuits 512b and 514b both format the audio signals as required by the respective formats. Programmable switch 510b, similar to programmable switch 510a, is programmed to select audio signals from one of circuits 512b or 514b according to the format provided by the sending circuit portion of system 600. Programmable switch 510b may be preprogrammed to associate telephone numbers of callers with associated capabilities. When a telephone call is placed to the receiving portion of system 600, channel interface device 206 detects the caller ID, the caller ID then being provided to programmable switch 510b so that programmable switch 510b may select the proper format for the audio signals to provide to transceiver 402b.

Note that in an example embodiment, programmable switch 510a, format circuit 512a, and format circuit 514a are implemented in software where MDPE 406 is a processor as described above. Functions of MDPE 406, switch 510a, format circuits 512a and 514a may be performed by the same or different processors. DDPE 408, format circuits 512b and 514b, and switch 510b may be similarly implemented.

The various embodiments described above are provided by way of illustration only and should not be construed to limit the invention. Those skilled in the art will readily recognize various modifications and changes that may be made to the present invention without strictly following the example embodiments and applications illustrated and described herein, and without departing from the true spirit and scope of the present invention, which is set forth in the following claims.

I claim:

1. A videoconferencing arrangement for communicating video data over a communications channel, comprising:
    a telephone unit including an interface circuit, user-selectable inputs and a telephone circuit configured to communicate through the interface circuit;
    means for automatically determining based on codes associated with telephone numbers stored in memory if a videoconferencing call is being initiated by a sequence of user-selectable inputs; and
    a videoconferencing circuit including a processor circuit, coupled to the telephone unit, configured to respond to the automatic determination means determining that a videoconferencing call is being initiated, by attempting to establish a videoconferencing call with another videoconferencing unit over the communications channel, and permitting a conventional telephone call to be initiated in response to determining that a videoconferencing call is not being initiated.

2. A videoconferencing arrangement, according to claim 1, wherein the interface circuit of the telephone unit is a wireless interface.

3. A videoconferencing arrangement, according to claim 1, further including a camera coupled to the processor circuit, both being disposed internal to a common housing.

4. A videoconferencing arrangement, according to claim 1, wherein the telephone unit further includes a depressable keys for engaging the user-selectable inputs.

5. A videoconferencing arrangement, according to claim 1, wherein the means for automatically determining is part of the processor circuit.

6. A videoconferencing arrangement, according to claim 1, wherein the means for automatically determining is part of the telephone circuit.

7. A videoconferencing arrangement, according to claim 1, wherein the means for automatically determining includes a programmable memory circuit.

8. A videoconferencing arrangement, according to claim 7, wherein the programmable memory circuit is configured and arranged to store codes associated with telephone numbers for remote videoconferencing units.

9. A videoconferencing arrangement, according to claim 8, wherein the codes associated with telephone numbers are the telephone numbers.

10. A method of videoconferencing, according to claim 1, wherein the processor circuit includes a first audio signal format for the videoconferencing call and another audio signal format for the conventional telephone call.

11. A method of videoconferencing, according to claim 10, wherein the first audio format is compatible with a protocol for passing real-time video.

12. A videoconferencing arrangement for communicating video data over a communications channel, comprising:
    a telephone unit including an interface circuit, user-selectable inputs and a telephone circuit configured to communicate through the interface circuit, the telephone circuit including a memory circuit arranged to store codes associated with telephone numbers for remote videoconferencing units, and further including a control circuit, responsive to the user-selectable inputs, for accessing the codes to determine if a videoconferencing call is being initiated; and
    a videoconferencing circuit including a processor circuit, coupled to the telephone unit, configured to respond to a selected command from the telephone unit by attempting to establish a videoconferencing call with another videoconferencing unit over the communications channel.

13. A videoconferencing arrangement, according to claim 12, wherein the telephone unit is a wireless unit configured to communicate with a base unit that includes the videoconferencing circuit.

14. A method of videoconferencing, according to claim 12, wherein the first audio format is compatible with a protocol for passing real-time video.

15. A videoconferencing arrangement for communicating video data over a communications channel, comprising:
    a telephone unit including an interface circuit, user-selectable inputs and a telephone circuit configured to communicate through the interface circuit; and
    a videoconferencing circuit including a processor circuit, coupled to the telephone unit, configured to respond to a selected command from the telephone unit by attempting to establish a videoconferencing call with another videoconferencing unit over the communications channel, the videoconferencing circuit including a memory circuit arranged to store codes associated with telephone numbers for remote videoconferencing units, and wherein the processor circuit is configured to respond to the user-selectable inputs by accessing the codes to determine if a videoconferencing call is being initiated.

16. A method of videoconferencing, according to claim 15, wherein the first audio format is compatible with a protocol for passing real-time video.

17. A method of videoconferencing over a communications channel, comprising:
    providing a memory circuit and storing therein codes that indicate if a telephone number is associated with a remote videoconferencing unit;
    using a telephone circuit with user-selectable inputs to communicate DTMF commands;
    in response to the DTMF commands, using the stored codes in the memory circuit to automatically determine if a videoconferencing call is being initiated by a sequence of user-selectable inputs; and in response to determining that a videoconferencing call is being initiated, using a processor-based videoconferencing circuit to attempt to establish a videoconferencing call with the remote videoconferencing unit over the communications channel.

18. A method of videoconferencing over a communications channel, according to claim 17, further including providing the memory circuit as part of the telephone circuit.

19. A method of videoconferencing over a communications channel, according to claim 17, further including providing the memory circuit as part of the processor-based videoconferencing circuit.

20. A method of videoconferencing over a communications channel, according to claim 17, further including attempting to establish a conventional telephone call over the communications channel in response to determining that a videoconferencing call is not being initiated.

21. A method of videoconferencing, according to claim 17, wherein the first audio format is compatible with a protocol for passing real-time video.

* * * * *

UNITED STATES PATENT AND TRADEMARK OFFICE
CERTIFICATE OF CORRECTION

PATENT NO. : 6,163,335 Page 1 of 1
DATED : December 19, 2000
INVENTOR(S) : Barraclough It is certified that error appears in the above-identified patent and that said Letters Patent is hereby corrected as shown below:

Column 3,
Line 16, "VIDEOCOMMUNICATING AND METHOD" should read
-- VIDEOCOMMUNICATING APPARATUS AND METHOD --.

Column 4,
Line 2, "unit 108*a*for" should read -- unit 108*a* for --.
Line 4, "unit 108*a*receives" should read -- unit 108*a* receives --.

Column 5,
Line 50, "FIG. 4 if" should read -- FIG. 4 is --.

Column 6,
Line 2, "(such as those from portable unit 306." should read -- (such as those from portable unit 306). --.

Column 7,
Line 10, "ID then being provided" should read -- ID is then provided --.

Signed and Sealed this

Fourteenth Day of January, 2003

JAMES E. ROGAN
*Director of the United States Patent and Trademark Office*